(12) United States Patent
Niyogi

(10) Patent No.: US 6,451,897 B1
(45) Date of Patent: Sep. 17, 2002

(54) NANOCOMPOSITES MADE FROM POLYPROPYLENE GRAFT COPOLYMERS

(75) Inventor: Suhas G. Niyogi, Hockessin, DE (US)

(73) Assignee: Basell Technology Company BV, Hoofddorp (NL)

( * ) Notice: Subject to any disclaimer, the term of this patent is extended or adjusted under 35 U.S.C. 154(b) by 37 days.

(21) Appl. No.: 09/596,092

(22) Filed: Jun. 16, 2000

(51) Int. Cl.⁷ .................................................. C08J 11/00
(52) U.S. Cl. ........................ 524/445; 524/186; 524/504; 524/505; 525/64; 525/70
(58) Field of Search .................................. 524/445, 447, 524/448, 186, 504, 505, 529; 525/63, 64, 70

(56) References Cited

U.S. PATENT DOCUMENTS

| | | |
|---|---|---|
| 4,810,734 A | 3/1989 | Kawasumi et al. |
| 5,140,074 A | 8/1992 | DeNicola, Jr. et al. |
| 5,212,246 A | 5/1993 | Ogale |
| 5,286,791 A | 2/1994 | DeNicola, Jr. et al. |
| 5,302,454 A | 4/1994 | Cecchin et al. |
| 5,409,992 A | 4/1995 | Eppert, Jr. |
| 5,514,734 A | 5/1996 | Maxfield et al. |
| 5,652,284 A | 7/1997 | Eidt, Jr. et al. |
| 5,674,930 A | 10/1997 | Sugiura et al. |
| 5,760,121 A | 6/1998 | Beall et al. |
| 5,840,796 A | 11/1998 | Badesha et al. |
| 5,876,812 A | 3/1999 | Frisk et al. |
| 5,883,173 A | 3/1999 | Elspass et al. |
| 5,910,523 A | 6/1999 | Hudson |
| 5,939,184 A * | 8/1999 | Inoue et al. ................. 428/331 |

OTHER PUBLICATIONS

Kawasumi, M; Hasegawa, N; Kato, M; Usuki, A; Okada, A Macromolecules 1997, 30, 6333–6338.*

* cited by examiner

*Primary Examiner*—Edward J. Cain
*Assistant Examiner*—Kataryna W. Lee

(57) ABSTRACT

A nanocomposite material comprises a smectite clay having exhangeable cations that has been treated with at least one organic swelling agent, uniformly dispersed in a graft copolymer having a backbone of a porous propylene polymer material, to which is graft polymerized at least one grafting monomer capable of being polymerized by free radicals, wherein the total inorganic content of the composite material is about 0.5% to about 10%, based on the total weight of the composite. The nanocomposite material is made by graft polymerizing at least one liquid monomer capable of being polymerized by free radicals onto a porous propylene polymer material in a non-oxidizing environment in the presence of a smectite clay and an organic free radical polymerization initiator, whereby the chains of polymerized monomer that are formed intercalate the clay and produce a uniform dispersion of clay particles within the particulate propylene polymer material.

19 Claims, No Drawings

NANOCOMPOSITES MADE FROM POLYPROPYLENE GRAFT COPOLYMERS

FIELD OF THE INVENTION

This invention relates to nanocomposite materials comprising a graft copolymer of a propylene polymer material, and a smectite-type clay that has been treated with a swelling agent.

BACKGROUND OF THE INVENTION

Layered clay minerals such as montmorillonite are composed of silicate layers with a thickness on a nanometer scale (1 nanometer=10 Å). Dispersion of such layered materials in polymers are frequently referred to as nanocomposites.

It is known that these silicates, such as smectite clays, e.g., sodium and calcium montmorillonite, can be treated with organic swelling agents such as organic ammonium ions, to intercalate the swelling agent molecules between adjacent, planar silicate layers, thereby substantially increasing the interlayer spacing and making the clay more hydrophobic and better suited for interaction with polymer precursors. The intercalated silicates can then be exfoliated, i.e., the silicate layers are separated, typically by high shear mixing. The individual silicate layers, when admixed with a matrix polymer before, after, or during the polymerization of the matrix polymer, have been found to substantially improve one or more properties of the polymer such as mechanical strength and/or high temperature characteristics.

For example, U.S. Pat. No. 4,810,734 discloses a process for producing a composite material by contacting a layered clay mineral with a swelling agent in the presence of a dispersion medium such as water, an alkanol, or dimethyl sulfoxide, mixing with a molten polymerizable monomer or a mixture of monomer and dispersion medium, and polymerizing the monomer in the mixture. Catalysts and accelerators for polymerization can also be present. The polymer that is formed can be, for example, a polyamide, a vinyl polymer, or a thermoset resin.

U.S. Pat. No. 5,514,734 discloses a composite material comprising a polymer matrix having layered or fibrillar particles, e.g., phyllosilicates, uniformly dispersed therein, the particles being bonded to organosilanes, organo titanates, or organo zirconates and having one or more moieties bonded to at least one polymer in the polymer matrix. The polymer matrix can be, for example, a polyester, polyolefin, or polyamide.

U.S. Pat. No. 5,760,121 discloses a composite material comprising a host material such as a polyamide, polyvinylamine, polyethylene terephthalate, polyolefin, or polyacrylate, and exfoliated platelets of a phyllosilicate material. The platelets are derived from an intercalate formed without an onium ion or silane coupling agent by contacting with an intercalant polymer-containing composition containing water and/or an organic solvent. Suitable intercalant polymers include polyolefins and acrylic polymers.

U.S. Pat. No. 5,910,523 discloses a composition comprising (a) a semi-crystalline polyolefin, (b) a clay filler having dispersible platelets in stacks, (c) an amino-functional silane reacted with the filler, and (d) a carboxylated or maleated semi-crystalline polyolefin that has been reacted with the aminofunctional silane after the silane was reacted with the filler.

Incorporating clay minerals into a polymer matrix, however, does not always result in markedly improved mechanical properties. This may be due in part to the inability to exfoliate all or at least a substantial portion of the layers of the silicate material. It may also be due in part to the lack of affinity between the layered silicate materials and the organic polymers. Attempts to overcome these problems have not been totally successful. There is therefore a need for novel composite materials that have desirable mechanical and physical properties.

SUMMARY OF THE INVENTION

The composite material of this invention comprises (1) a graft copolymer comprising a backbone of a particulate propylene polymer material having a weight average diameter of about 0.4–7 mm, a surface area of at least 0.1 $m^2/g$, and a pore volume fraction of at least about 0.07 and wherein more than 40% of the pores in the particle have a diameter greater than 1 micron, to which is graft polymerized at least one grafting monomer capable of being polymerized by free radicals and (2) a smectite clay having exchangeable cations that has been treated with at least one organic swelling agent, uniformly dispersed in the particulate propylene polymer material, wherein the total inorganic content of the composite material is about 0.5% to about 10%, based on the total weight of the composite.

The composite material of this invention is made by a process comprising, in a substantially non-oxidizing environment, graft polymerizing at least one liquid monomer capable of being polymerized by free radicals to a particulate propylene polymer material having a weight average diameter of about 0.4–7 mm, a surface area of at least 0.1 $m^2/g$, and a pore volume fraction of at least about 0.07 and wherein more than 40% of the pores in the particle have a diameter greater than 1 micron, in the presence of (1) a smectite clay having exchangeable cations that has been treated with at least one organic swelling agent, and (2) about 0.1 parts to about 6 parts per hundred parts of the propylene polymer material of an organic free radical polymerization initiator, at a reaction temperature of about 60° C. to about 125° C., whereby the chains of polymerized monomer that are formed intercalate the clay and produce a uniform dispersion of clay particles within the particulate propylene polymer material, the composite material having an inorganic content of about 0.5% to about 10%, based on the total weight of the composite.

The polymer nanocomposites produced according to the method of this invention have excellent mechanical properties such as heat distortion temperature, tensile strength, and flexural modulus.

DETAILED DESCRIPTION OF THE INVENTION

The propylene polymer material that is used as the backbone of the graft copolymer in the composite material of this invention can be:
(1) a homopolymer of propylene having an isotactic index greater than 80, preferably about 85 to about 99;
(2) a copolymer of propylene and an olefin selected from the group consisting of ethylene and 4–10 C alpha-olefins, provided that when the olefin is ethylene, the maximum polymerized ethylene content is about 10%, preferably about 4%, and when the olefin is a 4–10 C alpha-olefin, the maximum polymerized content thereof is about 20% by weight, preferably about 16%, the copolymer having an isotactic index greater than 85;
(3) a terpolymer of propylene and two olefins selected from the group consisting of ethylene and 4–8 C alpha-olefins, provided that the maximum polymerized 4–8 C alpha-olefin content is 20% by weight, preferably about 16%, and, when ethylene is one of the olefins, the maximum polymerized ethylene content is 5% by weight, preferably about 4%, the terpolymer having an isotactic index greater than 85;

(4) an olefin polymer composition comprising:
  (a) about 10% to about 60% by weight, preferably about 15% to about 55%, of a propylene homopolymer having an isotactic index greater than 80, preferably about 85 to about 98, or a copolymer of monomers selected from the group consisting of (i) propylene and ethylene, (ii) propylene, ethylene and a 4–8 C alpha-olefin, and (iii) propylene and a 4–8 C alpha-olefin, the copolymer having a polymerized propylene content of more than 85% by weight, preferably about 90% to about 99%, and an isotactic index greater than 85;
  (b) about 5% to about 25% by weight, preferably about 5% to about 20%, of a copolymer of ethylene and propylene or a 4–8 C alpha-olefin that is insoluble in xylene at ambient temperature; and
  (c) about 30% to about 70% by weight, preferably about 40% to about 65%, of an elastomeric copolymer of monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% by weight of a polymerized diene and containing less than 70% by weight, preferably about 10% to about 60%, most preferably about 12% to about 55%, of polymerized ethylene and being soluble in xylene at ambient temperature and having an intrinsic viscosity, measured in decahydronaphthalene at 135° C., of about 1.5 to about 4.0 dl/g, wherein the total amount of (b) and (c), based on the total olefin polymer composition, is about 50% to about 90%, the weight ratio of (b)/(c) is less than 0.4, preferably 0.1 to 0.3, and the composition is prepared by polymerization in at least two stages and has a flexural modulus of less than 150 MPa; or (5) a thermoplastic olefin comprising:
  (a) about 10% to about 60%, preferably about 20% to about 50%, of a propylene homopolymer having an isotactic index greater than 80, or a copolymer of monomers selected from the group consisting of (i) ethylene and propylene, (ii) ethylene, propylene and a 4–8 C alpha-olefin, and (iii) ethylene and a 4–8 C alpha-olefin, the copolymer having a polymerized propylene content greater than 85% and an isotactic index of greater than 85;
  (b) about 20% to about 60%, preferably about 30% to about 50%, of an amorphous copolymer of monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% of a polymerized diene, and containing less than 70% polymerized ethylene and being soluble in xylene at ambient temperature; and
  (c) about 3% to about 40%, preferably about 10% to about 20%, of a copolymer of ethylene and propylene or a 4–8 C alpha-olefin that is insoluble in xylene at ambient temperature, wherein the thermoplastic olefin has a flexural modulus of greater than 150 but less than 1200 MPa, preferably about 200 to about 1100 MPa, and most preferably about 200 to about 1000 MPa. Room or ambient temperature is ~25° C.

The 4–8 C alpha-olefins useful in the preparation of (4) and (5) include, for example, butene-1, pentene-1; hexene-1; 4-methyl-1-pentene, and octene-1.

The diene, when present, is typically a butadiene; 1,4-hexadiene; 1,5-hexadiene, or ethylidenenorbornene.

Propylene polymer materials (4) and (5) can be prepared by polymerization in at least two stages, where in the first stage the propylene; propylene and ethylene; propylene and an alpha-olefin, or propylene, ethylene and an alpha-olefin are polymerized to form component (a) of (4) or (5), and in the following stages the mixtures of ethylene and propylene; ethylene and the alpha-olefin, or ethylene, propylene and the alpha-olefin, and optionally a diene, are polymerized to form components (b) and (c) of (4) or (5).

The polymerization can be conducted in liquid phase, gas phase, or liquid-gas phase using separate reactors, all of which can be done either by batch or continuously. For example, it is possible to carry out the polymerization of component (a) using liquid propylene as a diluent, and the polymerization of components (b) and (c) in gas phase, without intermediate stages except for the partial degassing of the propylene. All gas phase is the preferred method.

The preparation of propylene polymer material (4) is described in more detail in U.S. Pat. Nos. 5,212,246 and 5,409,992, which are incorporated herein by reference. The preparation of propylene polymer material (5) is described in more detail in U. S. Pat. Nos. 5,302,454 and 5,409,992, which are incorporated herein by reference.

Propylene homopolymer is the preferred propylene polymer backbone material.

The propylene polymer material used as the backbone of the graft copolymer is in particulate form and has a weight average diameter of about 0.4–7 mm, a surface area of at least 0.1 m$^2$/g, and a pore volume fraction of at least about 0.07, i.e., seven percent of the volume is pores, and wherein more than 40% of the pores in the particle have a diameter greater than 1 micron. Preferably more than 50% of the pores in the particle have a diameter greater than 1 micron, and most preferably more than 90% of the pores in the particle have a diameter great than 1 micron. The pore volume fraction is preferably at least 0.12, most preferably at least 0.20.

The grafting monomers useful in accordance with this invention can be any monomeric vinyl compound capable of being polymerized by free radicals where the vinyl radical H$_2$C=CR—, in which R=H or methyl, is attached to a straight or branched aliphatic chain or to a substituted or unsubstituted aromatic, heterocyclic, or alicyclic ring in a mono- or polycyclic compound. Typical substituent groups can be alkyl, hydroyalkyl, aryl, and halo. Usually the vinyl monomer will be a member of one of the following classes: (1) vinyl-substituted aromatic, heterocyclic, or alicyclic compounds, including styrene, vinylnaphthalene, vinylpyridine, vinylpyrrolidone, vinylcarbazole, and homologs thereof, e.g., alpha- and para-methylstyrene, methylchlorostyrene, p-tert-butylstyrene, methylvinylpyridine, and ethylvinylpyridine; (2) vinyl esters of aromatic and saturated aliphatic carboxylic acids, including vinyl formate, vinyl acetate, vinyl chloroacetate, vinyl cyanoacetate, vinyl propionate, and vinyl benzoate; and (3) unsaturated aliphatic nitrites and carboxylic acids and their derivatives, including acrylonitrile; methacrylonitrile; acrylamide; methacrylamide, and acrylic acid; acrylate esters such as the methyl, ethyl, hydroxyethyl, 2-ethylhexyl, and butyl acrylate esters; methacrylic acid; ethacrylic acid, and methacrylate esters such as the methyl, ethyl, butyl, benzyl, phenylethyl, phenoxyethyl, epoxypropyl, and hydroxypropyl methacrylate esters, and maleic anhydride. One or more of these monomers can be used.

The total amount of polymerized monomers is about 10 to about 100 parts, prefer about 25 to about 95 parts, per hundred parts of the propylene polymer material.

The smectite clays that are the second component of the composite materials of this invention are layered silicate minerals having exchangeable cations that can be treated with organic swelling agents such as organic ammonium ions, to intercalate the organic molecules between adjacent planar silicate layers, thereby substantially increasing the interlayer spacing. The expansion of the interlayer distance of the layered silicate facilitates the intercalation of the clay with other materials, in this case the polymerizable grafting monomer. The interlayer spacing of the silicates can be further increased by formation of the polymerized monomer chains between the silicate layers. The intercalated silicate platelets act as a nanoscale (sub-micron size) filler for the polymer.

Intercalation of the silicate layers in the clay can take place either by cation exchange or by absorption. For intercalation by absorption, dipolar functional organic molecules such as nitrile, carboxylic acid, hydroxy, and pyrrolidone groups must be present on the clay surface. Intercalation by absorption can take place when either acid or non-acid clays are used as the starting material. Cation exchange takes place only if an ionic clay containing ions such as, for example, $Na^+$, $K^+$, $Ca^{++}$, $Ba^{++}$, and $Li^+$ is used. Acid clays are not suitable starting materials if intercalation by cation exchange is desired. Ionic clays can also absorb dipolar organic molecules.

Smectite clays include, for example, montmorillonite, saponite, beidellite, hectorite, and stevensite, where the space between silicate layers is typically 17–36 Å, measured by small angle X-ray scattering. Typically, a clay with exchangeable cations such as sodium, calcium and lithium ions is used. Montmorillonite in the sodium exchanged form is preferred.

The organic swelling agent used to treat the clay is a quaternary ammonium compound, excluding pyridinium ion, such as, for example, poly(propylene glycol)bis(2-aminopropyl ether), poly(vinylpyrrolidone), dodecylamine hydrochloride, octadecylamine hydrochloride, and dodecylpyrrolidone. Such treated clays are commercially available. One or more of these swelling agents can be used.

In the process of this invention the organoclay, the liquid monomer, and the polymerization initiator pass into the pores of the particulate propylene polymer material and the intercalation of the liquid monomer between the clay layers and subsequent graft polymerization reaction take place within the particles of propylene polymer material. While not intending to be bound by theory, it is believed that exfoliation (delamination), i.e., the separation of the silicate layers into individual silicate platelets, can take place when the particles of graft copolymer containing the intercalated clay particles are extruded to form useful articles of manufacture.

The total amount of inorganic material from the clay mineral in the composite product is about 0.5% to about 15%, preferably about 0.5% to about 10%, based on the total weight of the composite. The amount of clay used is limited by the extremely high viscosity of the clay/monomer suspension.

Optionally, the composite material can be blended with about 2% to about 45%, preferably about 5% to about 30%, based on the total weight of the composition, of one or more rubber components, and/or about 5% to about 90%, preferably about 10% to about 70%, based on the total weight of the composition, of a broad molecular weight distribution propylene polymer material.

The rubber component is selected from one or more of the group consisting of (i) an olefin copolymer rubber, (ii) a monoalkenyl aromatic hydrocarbon-conjugated diene block copolymer, and (iii) a core-shell rubber. Any of these rubber components can have acid or anhydride functionality or can be free of these functional groups. The preferred rubber components are (i) or (ii), either alone or in combination.

Suitable olefin copolymer rubbers include, for example, saturated olefin copolymer rubbers such as ethylene/propylene monomer rubbers (EPM), ethylene/octene-1, and ethylene/butene-1 rubbers, and unsaturated olefin copolymer rubbers such as ethylene/propylene/diene monomer rubbers (EPDM). The preferred olefin copolymer rubbers are ethylene/propylene, ethylene/butene-1, and ethylene/octene-1 copolymer rubbers.

The monoalkenyl aromatic hydrocarbon-conjugated diene block copolymer can be a thermoplastic elastomer of the A-B (or diblock) structure, the linear A-B-A (or triblock) structure, the radial $(A-B)_n$ type where n=3–20%, or a combination of these structure types, wherein each A block is a monoalkenyl aromatic hydrocarbon polymer block, and each B block is an unsaturated rubber block. Various grades of copolymers of this type are commercially available. The grades differ in structure, molecular weight of the mid and end blocks, and the ratio of monoalkenyl aromatic hydrocarbon to rubber. The block copolymer can also be hydrogenated. Typical monoalkenyl aromatic hydrocarbon monomers are styrene, ring-substituted 1–4 C linear or branched alkyl styrenes, and vinyltoluene. Styrene is preferred. Suitable conjugated dienes include, for example, butadiene and isoprene. Preferred block copolymers are hydrogenated styrene/ethylene-butene-1/styrene triblock copolymers.

The weight average molecular weight ($M_w$) of the block copolymers generally will be in the range of about 45,000 to about 260,000 g/mole, average molecular weights in the range of about 50,000 to about 125,000 g/mole being preferred because they produce compositions having the best balance of impact strength and stiffness. Also, while block copolymers having unsaturated as well as saturated rubber blocks can be used, copolymers having saturated rubber blocks are preferred, also on the basis of the impact/stiffness balance of the compositions containing them. The weight ratio of monoalkenyl aromatic hydrocarbon to conjugated diene rubber in the block copolymer is in the range of about 5/95 to about 50/50, preferably about 10/90 to about 40/60.

The core-shell rubber components comprise small particles of a crosslinked rubber phase surrounded by a compatibilizing shell, normally a glassy polymer or copolymer. The core is typically a diene rubber such as butadiene or isoprene rubber, or a polyacrylate. The shell is typically a polymer of two or more monomers selected from styrene, methyl methacrylate, and acrylonitrile. Particularly preferred core-shell rubbers have a polyacrylate core.

Suitable rubbers useful as impact modifiers include, for example, Engage 8100 and 8150 ethylene/octene-1 copolymers, commercially available from DuPont-Dow Elastomers; EPM 306P ethylene/propylene copolymer, commercially available from the Polysar Rubber Division of Miles, Incorporated; and Kraton RP6912 styrene/ethylene-propylene/styrene triblock copolymer rubber and Kraton FG1901X styrene/ethylene-butene-1/styrene triblock copolymer rubber modified with maleic anhydride, commercially available from Shell Chemical Company. A thermoplastic olefin such as the one described under (5) of the propylene polymer materials suitable for use as the backbone polymer of the graft copolymer can also be used as an impact modifier.

Another optional component that can be blended with the composite material of this invention is a broad molecular weight distribution propylene polymer material (BMWD PP) having a $M_w/M_n$ of about 5 to about 60, preferably about 5 to about 40; a melt flow rate of about 0.5 to about 50 g/10 min, preferably about 1 to about 30 g/10 min, and xylene insolubles at 25° C. of greater than or equal to 94%, preferably greater than or equal to 96%, and most preferably greater than or equal to 98%. The propylene polymer material having a broad molecular weight distribution can be a homopolymer of propylene or an ethylene/propylene rubber impact-modified homopolymer of propylene, wherein the propylene homopolymer has a broad molecular weight distribution.

The BMWD PP can be prepared by sequential polymerization in at least two stages in the presence of a Ziegler-Natta catalyst supported on magnesium halide in active form. The polymerization process occurs in separate and consecutive stages, and in each stage polymerization takes place in the presence of the polymer and the catalyst from the preceding stage.

The polymerization process can be carried out in a batch or in a continuous mode according to known techniques, operating in liquid phase in the presence or not of an inert diluent, or in gas phase, or liquid-gas phase, preferably in gas phase. The preparation of the BMWD PP is described in more detail in U.S. Pat. No. 5,286,791, which is incorporated herein by reference.

Other additives such as pigments, slip agents, waxes, oils, antiblocking agents and antioxidants can also be present in the composition.

The composite material of this invention is made by a process comprising, in a substantially non-oxidizing environment, graft polymerizing at least one liquid monomer capable of being polymerized by free radicals to a particulate propylene polymer material having a weight average diameter of about 0.4–7 mm, a surface area of at least 0.1 m²/g, and a pore volume fraction of at least 0.07, preferably at least 0.12, and most preferably at least 0.20, and wherein more than 40% of the pores in the particle have a diameter greater than 1 micron, preferably more than 50% and most preferably more than 90%, in the presence of (1) a smectite clay having exchangeable cations that has been treated with at least one organic swelling agent, and (2) about 0.1 to about 6 parts, preferably about 0.2 to about 3 parts, per hundred parts of the propylene polymer material of an organic free radical polymerization initiator at a reaction temperature of about 60° C. to about 125° C., whereby the chains of polymerized monomer that are formed intercalate the clay particles and produce a uniform dispersion of clay particles within the particulate propylene polymer material, the composite material having an inorganic content of about 0.5% to about 15%, preferably about 0.5% to about 10%, based on the total weight of the composition.

"Non-oxidizing environment" is the environment or atmosphere to which the olefin polymer material is exposed during the preparation of the graft copolymer and means an environment in which the active oxygen concentration, i.e., the concentration of oxygen in a form that will react with the free radicals in the polymer material, is less than 15%, preferably less than 5%, and most preferably less than 1% by volume. The most preferred concentration of active oxygen is 0.004% or lower by volume. Within these limits, the non-oxidizing atmosphere can be any gas, or mixture of gases, that is oxidatively inert toward the free radicals in the olefin polymer material, e.g., nitrogen, argon, helium, and carbon dioxide.

Free radical or active sites are produced in the particulate propylene polymer material by treating the propylene polymer material with an organic compound that is a free-radical-generating polymerization initiator. The polymerization initiator is one that has a decomposition half-life at the temperature employed of about 1 to about 240, preferably about 5 to about 100, and most preferably about 10 to about 40, minutes. Organic peroxides, and especially those that generate alkoxy radicals, constitute the preferred class of initiators. These include acyl peroxides, such as benzoyl and dibenzoyl peroxides; dialkyl and aralkyl peroxides, such as di-tert-butyl peroxide, dicumyl peroxide, cumyl butyl peroxide, 1,1-di-tert-butylperoxy-3,5,5-trimethylcyclohexane, 2,5-dimethyl-2,5-di-tert-butylperoxyhexane, and bis(alpha-tert-butyl peroxyisopropyl-benzene); peroxy esters, such as tert-butylperoxy pivalate, tert-butyl perbenzoate, tert-butyl peroctoate; 2,5-dimethylhexyl 2,5-di(perbenzoate), tert-butyl di(perphthalate), tert-butylperoxy-2-ethyl hexanoate; and 1,1-dimethyl-3-hydroxybutylperoxy-2-ethyl hexanoate; and peroxy carbonates, such as di(2-ethylhexyl) peroxy dicarbonate, di(n-propyl)peroxy dicarbonate, and di(4-tert-butylcyclohexyl)peroxy dicarbonate. Peroxy esters are preferred.

Preparation of graft copolymers by contacting a propylene polymer material with a free radical polymerization initiator such as an organic peroxide and a vinyl monomer is described in more detail in U.S. Pat. No. 5,140,074, which is incorporated herein by reference.

In one embodiment of the process of this invention, the particulate propylene polymer material is heated to the reaction temperature, the organic free radical initiator is added, and a suspension of the clay in liquid monomer is then added separately.

In a second embodiment of the process of this invention, the particulate propylene polymer material is mixed with a suspension of the clay in liquid monomer, the mixture is heated to the reaction temperature, and the organic free radical initiator is added.

In a third embodiment, a suspension of the clay in liquid monomer and the organic free radical initiator are added concurrently to the particulate propylene polymer material, which has been heated to the reaction temperature.

In another embodiment, the clay is mixed with the particulate propylene polymer material in the presence of an aliphatic hydrocarbon solvent, the mixture is heated to the reaction temperature to remove the solvent, and the organic free radical initiator and liquid monomer are added concurrently. Suitable hydrocarbon solvents include pentane, heptane, and 8–12 C linear or branched aliphatic hydrocarbons.

In preparing the organoclay/monomer suspensions in the process of this invention, the clay and the organic swelling agent are mixed, which produces a hydrophobic organoclay. The hydrophobic clay is then dried and pulverized. Monomer is added to the pulverized organoclay with stirring for a prolonged period of time. Suspending or thickening agents such as polyvinyl alcohol can also be added during the stirring process.

We have found that simply mixing a preformed graft copolymer with an organoclay, rather than graft polymerizing in the presence of an organoclay, does not produce a significant improvement in the mechanical properties of the product.

The composite materials made by the process of this invention have improved tensile strength, flexural modulus, and heat stability. They can be used to make articles of manufacture by conventional shaping processes such as melt spinning, casting, vacuum molding, sheet molding, injection molding and extruding. Examples of such articles are components for technical equipment, household equipment, sports equipment, bottles, containers, components for the electrical and electronics industries, automobile components, and fibers. They are especially useful for the fabrication of extruded films and film laminates, for example, films for use in food packaging.

The test methods used to evaluate the composites of this invention include:

| | |
|---|---|
| Flexural modulus | ASTM D-790-86 |
| Tensile strength | ASTM D-638-89 |
| Elongation at yield | ASTM D-638-89 |
| Melt flow rate (propylene polymer materials) (230° C., 2.16 kg) | ASTM D-1238 |
| Dual gated tensile strength | ASTM D-638-89 |
| Flexural strength | ASTM D-618, Procedure A |
| Notched Izod impact | ASTM D-256-87 |
| Rockwelt hardness, R | ASTM D-785 |
| Heat distortion temperature | ASTM D-648 |
| Strength @ break | ASTM D-638-89 |
| 2% Secant modulus | ASTM D-882 |

Isotactic index is defined as the per cent of olefin polymer insoluble in xylene. The weight percent of olefin polymer soluble in xylene at room temperature is determined by dissolving 2.5 g of the polymer in 250 ml of xylene in a vessel equipped with a stirrer, that is heated at 135° C. with agitation for 20 minutes. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until a constant weight is reached. The percent by weight of polymer insoluble in xylene at room temperature is the isotactic index of the polymer. The value obtained in this manner corresponds substantially to the isotactic index determined via extraction with boiling n-heptane, which by definition constitutes the isotactic index of the polymer.

Intrinsic viscosity is measured in decahydronaphthalene at 135° C.

The pore volume fraction values were determined by a mercury porosimetry technique in which the volume of mercury absorbed by the particles is measured. The volume of mercury absorbed corresponds to the volume of the pores. This method is described in Winslow, N. M. and Shapiro, J. J., "An Instrument for the Measurement of Pore-Size Distribution by Mercury Penetration," ASTM Bull., TP 49, 39–44 (February 1959), and Rootare, H. M., "A Review of Mercury Porosimetry," 225–252 (In Hirshhom, J. S. and Roll, K. H., Eds., *Advanced Experimental Techniques in Powder Metallurgy*, Plenum Press, New York, 1970).

The surface area measurements were made by the B.E.T. method as described in JACS 60, 309 (1938).

In this specification, all parts and percentages are by weight unless otherwise noted.

EXAMPLE 1

This example describes the preparation and properties of composites comprising polypropylene grafted with polystyrene in the presence of clays that have been treated with various swelling agents.

The clay used in the preparation of organoclays A and B was Montmorillonite K10, an acid clay that is commercially available from Aldrich Chemical Company. The clay had the following properties: surface area=220–270 $m^2/g$; bulk density=300–370 g/l, and pore volume=0.29 $cm^3/g$.

Organoclay A was prepared by suspending 30 g of montmorillonite K10 in 200 ml of deionized water and heating to 60° C. In a separate beaker, 15 g of poly(propylene glycol) bis(2-aminopropyl ether) were dissolved in 100 ml of water and heated to 70–75° C. 37% HCl (12 g) was added slowly while stirring. After two hours, the solution was poured into the clay suspension maintained at 60° C. and stirred for two hours at that temperature. The resulting organoclay was filtered, washed neutral, air dried, and finally dried at 60° C. under vacuum. The final weight was 38 g. Intercalation of the silicate layers of the clay with the organic swelling agent took place by absorption.

Organoclay B was prepared by suspending 110 g of montmorillonite K10 in 500 ml of water, and heating to 50° C. with a 3% aqueous solution of $NaHCO_3$ for four hours. In a separate beaker, 40 g of dodecylamine and 2 g of poly(propylene glycol)bis(2-aminopropyl ether) were suspended in 200 ml of water at 80° C. A solution of 30% HCl (20 ml) was added slowly to obtain a clear solution. This clear solution was added to the clay suspension at 60° C. and stirred for two hours. The clay was filtered, washed neutral, and dried to obtain 123 g of product. Intercalation of the silicate layers of the clay with the organic swelling agents took place by ion exchange.

Composites A and B were prepared using a 2 liter glass jacketed reactor fitted with an air driven helical stirrer, a thermocouple, nitrogen inlet and outlet, and monomer and peroxide addition needles.

The propylene homopolymer used as the backbone polymer in the preparation of the graft copolymer had the following properties: a melt flow rate of 9 kg/min, a pore volume fraction of 0.28, a surface area of 0.3 $m^2/g$, and greater than 40% of the pores with a diameter greater than one micron, commercially available from Montell USA Inc.

Composite A was prepared by suspending organoclay A (30 g) in styrene (140 g) and purging with nitrogen at 10° C. for 15 minutes. The propylene homopolymer (350 g) was charged to the reactor and purged with nitrogen at room temperature for two hours and at 40° C. for two hours. The reactor temperature was reduced to about 30° C. A deaerated solution of 4.4 g of tert-butylperoxy pivalate in 80 ml of cold pentane was fed to the reactor over a period of ten minutes and pentane was driven out with a flow of nitrogen and was collected in a cold trap. The reactor was heated to 64° C. for 35–40 minutes under a slow flow of nitrogen. The nitrogen flow was cut off and the clay suspension in styrene was added slowly over a period of thirty minutes. The styrene add level was 40 parts styrene per hundred parts of propylene homopolymer. The reactor temperature increased to 78° C. from the heat of polymerization and was maintained at 75°–78° C. for five hours. The reaction mixture was cooled under nitrogen, then polymer was taken out and subjected to vacuum at 60° C. The final weight of the product was 510 g.

Composite B was prepared in the manner described above except that organoclay B was used in place of organoclay A.

The graft copolymer/clay composites were dry mixed in a plastic bag with the amounts of rubber and stabilizer shown in Table 1 prior to extrusion. The mixture was extruded on a Haake twin screw extruder at 232° C. and molded on a Boy molding machine at 215° C. to prepare the samples for physical testing.

The rubber was Engage 8100 ethylene/octene-1 rubber containing 24% octene-1, commercially available from DuPont-Dow Elastomers. The stabilizer was a 2.5/1 blend of Irganox 215 antioxidant and calcium stearate. Irganox 215 antioxidant is a mixture of 1 part Irganox 1010 antioxidant and 2 parts Irgafos 168 tris(2,4-di-tert-butylphenyl) phosphite stabilizer, commercially available from Ciba Specialty Chemicals Corporation.

The propylene homopolymer grafted with polystyrene in the Control was prepared as described under Composite A, except that no clay was present. An attempt to suspend the clay in styrene monomer for grafting was unsuccessful. The graft copolymer, montmorillonite K10 (designated as Mont. K10 in Table 1), rubber, and stabilizer in the amounts shown in Table 1 were dry mixed prior to extrusion. The clay was not treated with a swelling agent. The dry mixed materials were extruded on a Haake twin screw extruder at 450° F. at 100 rpm.

The composition of the samples and the results of the physical property testing are given in Table 1. In Table 1, % polystyrene (PSt), % propylene homopolymer (PP), % rubber, % organoclay, and % inorganic content all refer to the % by weight of the final product.

TABLE 1

| Sample | 1 | 2 | Control |
|---|---|---|---|
| Composite A (g) | 480 | — | — |
| Composite B (g) | — | 480 | — |
| Engage 8100 rubber (g) | 35 | 35 | 35 |
| Stabilizer (g) | 0.9 | 0.9 | 0.9 |
| PP-g-styrene (g) | — | — | 450 |
| Mont. K10 (g) | — | — | 30 |
| PSt (%) | 25.1 | 25.19 | 28.58 |
| PP (%) | 62.72 | 62.74 | 71.42 |
| Engage 8100 rubber (%) | 6.80 | 6.80 | 6.80 |
| Organoclay (%) | 5.38 | 5.38 | 5.82 |
| Inorganic content (%) | 3.88 | 3.89 | 5.82 |
| Tensile strtength (MPa) | 31.2 | 32.3 | 31.3 |
| Elong. @ yield (%) | 3.1 | 3.3 | 3.6 |
| Strength @ break (MPa) | 27.4 | 26.2 | 25.6 |
| Flex. strength (MPa) | 49.8 | 51.5 | 49.3 |
| Flex. modulus (MPa) | 1807 | 1908 | 1732 |
| Izod impact @ 23° C. (ft.lb/in) | 0.43 | 0.49 | 0.60 |
| Hardness R | 97 | — | 93 |
| HDT @ 455 kPa (° C.) | 100 | — | 96 |

The data show that the composite materials of this invention have a better balance of physical properties than the control, in which the preformed graft copolymer was mixed with a clay that was not treated with an organic swelling agent.

EXAMPLE 2

This example describes the preparation and properties of composites comprising polypropylene grafted with polystyrene in the presence of a commercial organoclay.

The clay/monomer suspension in Sample 1 was EA 2782, a suspension in styrene monomer of montmorillonite that was treated with a swelling agent, supplied by RHEOX, Inc.

The composite described in Sample 1 was prepared as follows. The propylene homopolymer described in Example 1 (400 g) was purged with nitrogen and heated to 115° C. under a nitrogen purge. The suspension of clay in styrene monomer (195 g) was fed to the reactor described in Example 1 at a rate of about 4.1 g/min. In Table 2, pph refers to the parts of styrene added per hundred parts of propylene homopolymer. Tert-butyl peroctaoate (8.32 g) was diluted with 25 ml of n-octane and fed into the reactor over a period of 15 minutes. The polymerization was continued for another two hours at a reactor pressure of 6 psi. The temperature was raised to 125° C. and purged with nitrogen for 60 minutes. After cooling, 590 g of product was removed from the reactor.

The graft copolymer used in Control Example 1 was prepared as described above, except that clay was not present.

The graft copolymer in Sample 1 and in the control was stabilized with the same stabilizer as in Example 1. The stabilized graft copolymer/clay composite and the control without clay were then extruded on a Haake twin screw extruder at 450° F. and molded on a Boy molding machine at a temperature of 450° F.

The composition of the samples and the results of the physical property testing are given in Table 2.

TABLE 2

| Sample 1 | 1 | Control 1 |
|---|---|---|
| Styrene (pph) | 20.0 | 21.5 |
| Clay (% in monomer) | 8 | — |
| Stabilizer (%) | 0.2 | 0.2 |
| Inorganic content of product (%) | 1.7 | 0.0 |
| Notched Izod impact (ft-lb/in) | 0.44 | 0.36 |
| Tensile strength (kpsi) | 5.80 | 5.54 |
| Elong. @ yield (%) | 4.3 | 4.9 |
| 2% Secant modulus (kpsi) | 298 | 262 |

The data show that although only a small amount of clay was present in the product (1.7%), the physical properties of the composite material were better than those of the control without clay.

EXAMPLE 3

This example describes a larger scale preparation and the properties of composites comprising polypropylene grafted with polystyrene (PP-g-St) or poly(methyl methacrylate) (PP-g-PMMA) in the presence of a commercial organoclay.

The organoclays were supplied as a suspension in styrene or methyl methacrylate of montmorillonite that had been treated with a swelling agent, available from RHEOX, Inc.

The composite described in Sample 1 of Table 3 was prepared as follows. The propylene homopolymer (3.5 lb) (1.3 kg) described in Example 1 was charged to a reactor and the reactor was purged with nitrogen for about one hour at room temperature. The reactor was heated to 120° C. under a nitrogen purge, after which the purge was terminated. The organoclay/styrene suspension EA-2780 (600 g) was diluted with 200 g of styrene monomer under a nitrogen purge with stirring. Tert-butyl peroctoate (28 g of 50% solution in odorless mineral spirits diluted with 50 ml of heptane) and the clay/styrene suspension were concurrently fed to the reactor at a rate of 2.5 ml/min and 15 ml/min, respectively. The total addition time was 90 minutes. The reaction was continued for one more hour and the reactor was purged with nitrogen to cool. The 5.04 lb (1.88 kg) of product contained 45 parts of styrene per hundred parts of propylene homopolymer.

The polypropylene grafted with polystyrene in Control 1 was prepared by grafting polystyrene onto the propylene homopolymer described in Example 1 at a grafting temperature of 120° C. Forty-five parts by weight of styrene were added per 100 parts of propylene homopolymer (pph). Lupersol PMS 50% t-butylperoxy-2-ethyl hexanoate in e mineral spirits, commercially available from Elf Atochem, was used as the peroxide initiator. The monomer was fed at 0.9 pph/min, and a monomer to initiator molar ratio of 105 was used. After completion of monomer and peroxide addition, the temperature was raised to 140° C. for 60 minutes under a nitrogen purge.

The composite described in Sample 2 was prepared by mixing in the reactor 3.4 lb (1.27 kg) of the propylene homopolymer described in Example 1 and 3.5 lb (1.31 kg) of a suspension of the organoclay containing 9.53% methyl methacrylate under a nitrogen atmosphere at room temperature for 45 minutes. The mixture was heated to 95° C. and a solution of 28 g tert-butyl peroxypivalate (75% solution in odorless mineral spirits) diluted with 150 ml odorless mineral spirits was fed to the reactor at a rate of 6 ml/min. The polymerization was carried out at 95° C. for one hour after all of the solution was added. The reactor was heated to 100° C. and the pressure was released. The reactor was then purged with nitrogen and cooled. The final product (6.76 lb) (2.52 kg) contained 56.9 parts of poly(methyl methacrylate) (PMMA) per hundred parts of propylene homopolymer.

The polypropylene grafted with poly(methyl methacrylate-co-methyl acrylate) (PP-g-(MMA-co-MeAc) in Control 2 was prepared as follows. The propylene homopolymer used as the backbone polymer for the graft copolymer was the same as in Example 1. The monomers (95.6% methyl methacrylate, 4.4% methyl acrylate) were grafted onto the propylene homopolymer backbone at a grafting temperature of 114° C. Ninety-five parts by weight monomers were added per 100 parts of propylene homopolymer (pph). Tert-butylperoxy-2-ethyl hexanoate (2.1 pph active peroxide, 50% in mineral spirits) was used as the peroxide initiator. The methyl methacrylate (MMA) and methyl acrylate were premixed and fed at 1.0 pph/min for 95 minutes. A monomer to initiator ratio of 120 was used. After addition of the monomers was complete, the temperature was raised to 140° C. for an additional 60 to 120 minutes under a nitrogen purge until the amount of unreacted MMA in the product was <500 parts per million.

The graft copolymer/clay composites and the graft copolymers without the clay were mixed with the amounts of Engage 8150 elastomer or olefin polymer impact modifier, broad molecular weight distribution propylene homopolymer (BMWD PP), and stabilizer shown in Table 3 by dry mixing in a plastic bag. The compositions were then extruded on a Leistritz 30 mm twin screw extruder at 180–190° C., 300 RPM, and a feed rate of 15–20 lb (5.6–7.5 kg)/hr. The samples were then molded on a Boy molding machine at 450° F. to prepare the samples for physical testing.

The olefin polymer composition used as the impact modifier in Sample 1 and Control Example 1 comprised (a) 40% propylene homopolymer, (b) 15% of an ethylene/propylene copolymer insoluble in xylene and containing ~90% ethylene, and (c) 45% of an ethylene/propylene copolymer that is soluble in xylene at room temperature and contained 50–55% ethylene, commercially available from Montell USA Inc.

The broad molecular weight distribution polypropylene (BMWD PP) had a MFR of 1.1 g/10 min, xylene insolubles at room temperature of 97.8%, and $M_w/M_n>6$, and is commercially available from Montell USA Inc.

The Engage 8150 ethylene/octene copolymer elastomer used in Sample 2 and Control 2 contained 25% polymerized octene monomer and is commercially available from DuPont-Dow Elastomers.

The stabilizer was the same as the one used in Example 1.

The composition of the samples and the results of the physical property testing are given in Table 3.

TABLE 3

| Sample | 1 | Control 1 | 2 | Control 2 |
| --- | --- | --- | --- | --- |
| BMWD PP (%) | 17.32 | 17.23 | 42.01 | 42.01 |
| Polyolefin impact modifier (%) | 43.22 | 43.29 | 0.0 | 0.0 |
| Stabilizer (%) | 0.2 | 0.2 | 0.2 | 0.2 |
| Engage 8150 elastomer (%) | 0.0 | 0.0 | 20.2 | 20.2 |
| PP-g-St (45-pph St) (%) | 39.46 | 39.48 | 0.0 | 0.0 |
| PP-g-(MMA-co-MeAc) (95 pph total monomers) (%) | 0.0 | 0.0 | 0.0 | 37.79 |
| PP-g-PMMA (56.9 pph) (%) | 0.0 | 0.0 | 37.79 | 0.0 |
| PSt in product (%) | 10.95 | 12.25 | 0.0 | 0.0 |
| PMMA in product (%) | 0.0 | 0.0 | 14.28 | 13.54 |
| Inorganic content in product (%) | 1.0 | 0.0 | 0.7 | 0.0 |
| MFR (dg/min) | 7.3 | 6.0 | 14.28 | 8.9 |
| Notched Izod impact (ft.lb/in) | 3.2 | 1.6 | 1.0 | 5.3 |
| Tensile strength (psi) | 3013 | 2913 | 3990 | 3330 |
| Flex. Modulus (kpsi) | 143 | 140 | 174 | 186 |

The data show that for the polystyrene-grafted system, the incorporation of clay improves the impact strength without any loss in modulus and tensile strength. For the PMMA-grafted system, however, tensile strength improves while modulus and impact strength decrease. The deterioration of the impact strength and the modulus are due to the degradation of the PMMA during processing. The higher melt flow of the composite compared to the control is evidence of the degradation of the PMMA.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. A composite material comprising (1) a graft copolymer comprising a backbone of a particulate propylene polymer material having a weight average diameter of about 0.4–7 mm, a surface area of at least 0.1 m²/g, and a pore volume fraction of at least about 0.07 and wherein more than 40% of the pores in the particle have a diameter greater than 1 micron, to which is graft polymerized at least one grafting monomer which is polymerized by free radicals and (2) smectite clay having exchangeable cations that has been treated with at least one organic swelling agent, uniformly dispersed in the particulate propylene polymer material, wherein the total inorganic content of the composite material is about 0.5% to about 10%, based on the total weight of the composite.

2. The composite of claim 1 wherein the propylene polymer material used as the backbone of the graft copolymer is selected from the group consisting of:

(1) a homopolymer of propylene having an isotactic index greater than 80;

(2) a copolymer of propylene and an olefin selected from the group consisting of ethylene and 4–10 C alpha-olefins, provided that when the olefin is ethylene, the maximum polymerized ethylene content is about 10%, and when the olefin is a 4–10 C alpha-olefin, the maximum polymerized content thereof is about 20% by weight, the copolymer having an isotactic index greater than 85;

(3) a terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85;

(4) an olefin polymer composition comprising:

(a) about 10% to about 60% by weight of a propylene homopolymer having an isotactic index greater than 80 or a copolymer of monomers selected from the group consisting of (i) propylene and ethylene, (ii) propylene, ethylene and a 4–8 C alpha-olefin, and (iii) propylene and a 4–8 C alpha-olefin, the copolymer having a polymerized propylene content of more than 85% by weight and an isotactic index greater than 85;

(b) about 5% to about 25% by weight of a copolymer of ethylene and propylene or a 4–8 C alpha-olefin that is insoluble in xylene at ambient temperature; and (c) about 30% to about 70% by weight of an elastomeric copolymer of monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% by weight of a polymerized diene and containing less than 70% by weight of polymerized ethylene and being soluble in xylene at ambient temperature and having an intrinsic viscosity, measured in decahydronaphthalene at 135° C., of about 1.5 to about 4.0 dl/g, wherein the total amount of (b) and (c), based on the total olefin polymer composition, is about 50% to about 90%, the weight ratio of (b)/(c) is less than 0.4 and the composition is prepared by polymerization in at least two stages and has a flexural modulus of less than 150 MPa; and (5) a thermoplastic olefin comprising:

(a) about 10% to about 60% of a propylene homopolymer having an isotactic index greater than 80, or a copolymer of monomers selected from the group consisting of (i) ethylene and propylene, (ii) ethylene, propylene and a 4–8 C alpha-olefin, and (iii) ethylene and a 4–8 C alpha-olefin, the copolymer having a polymerized propylene content greater than 85% and an isotactic index of greater than 85;

(b) about 20% to about 60% of an amorphous copolymer of monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% of a polymerized diene, and containing less than 70% polymerized ethylene and being soluble in xylene at ambient temperature; and (c) about 3% to about 40% of a copolymer of ethylene and propylene or a 4–8 C alpha-olefin that is insoluble in xylene at ambient temperature, wherein the thermoplastic olefin has a flexural modulus of greater than 150 but less than 1200 Mpa.

3. The composite of claim 2 wherein the propylene polymer material is a propylene homopolymer.

4. The composite of claim 1 wherein the polymerizable monomer is styrene.

5. The composite of claim 1 wherein the polymerizable monomers are methyl methacrylate and methyl acrylate.

6. The composite of claim 1 wherein the smectite clay is montmorillonite in its sodium exchanged form.

7. A process for making a composite material comprising, in a non-oxidizing environment, graft polymerizing at least one liquid monomer which is polymerized by free radicals, to a particulate propylene polymer material having a weight average diameter of about 0.4–7 mm, a surface area of at least 0.1 m²/g, and a pore volume fraction of at least about 0.07 and wherein more than 40% of the pores in the particle have a diameter greater than 1 micron, in the presence of (1) a smectite clay having exchangeable cations that has been treated with at least one organic swelling agent, and (2) about 0.1 parts to about 6 parts per hundred parts of the propylene polymer material of an organic free radical polymerization initiator, at a reaction temperature of about 60° C. to about 125° C., whereby the chains of polymerized monomer that are formed intercalate the clay particles and produce a uniform dispersion of clay particles within the particulate propylene polymer material, the composite material having an inorganic content of about 0.5% to about 10%, based on the total weight of the composite.

8. The process of claim 7 wherein the propylene polymer material used as the backbone of the graft copolymer is selected from the group consisting of:

(1) a homopolymer of propylene having an isotactic index greater than 80;

(2) a copolymer of propylene and an olefin selected from the group consisting of ethylene and 4–10 C alpha-olefins, provided that when the olefin is ethylene, the maximum polymerized ethylene content is about 10%, and when the olefin is a 4–10 C alpha-olefin, the maximum polymerized content thereof is about 20% by weight, the copolymer having an isotactic index greater than 85;

(3) a terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85;

(4) an olefin polymer composition comprising:
  (a) about 10% to about 60% by weight of a propylene homopolymer having an isotactic index greater than 80 or a copolymer of monomers selected from the group consisting of (i) propylene and ethylene, (ii) propylene, ethylene and a 4–8 C alpha-olefin, and (iii) propylene and a 4–8 C alpha-olefin, the copolymer having a polymerized propylene content of more than 85% by weight and an isotactic index greater than 85;
  (b) about 5% to about 25% by weight of a copolymer of ethylene and propylene or a 4–8 C alpha-olefin that is insoluble in xylene at ambient temperature; and
  (c) about 30% to about 70% by weight of an elastomeric copolymer of monomers selected from the group consisting of (i) ethylene and propylene, (ii) ethylene, propylene and a 4–8 C alpha-olefin, and (iii) ethylene and a 4–8 C alpha-olefin, the copolymer optionally containing about 0.5% to about 10% by weight of a polymerized diene and containing less than 70% by weight of polymerized ethylene and being soluble in xylene at ambient temperature and having an intrinsic viscosity, measured in decahydronaphthalene at 135° C., of about 1.5 to about 4.0 dl/g, wherein the total amount of (b) and (c), based on the total olefin polymer composition, is about 50% to about 90%, the weight ratio of (b)/(c) is less than 0.4 and the composition is prepared by polymerization in at least two stages and has a flexural modulus of less than 150 MPa; and (5) a thermoplastic olefin comprising:
  (a) about 10% to about 60% of a propylene homopolymer having an isotactic index greater than 80, or a copolymer of monomers selected from the group consisting of (i) ethylene and propylene, (ii) ethylene, propylene and a 4–8 C alpha-olefin, and (iii) ethylene and a 4–8 C alpha-olefin, the copolymer having a polymerized propylene content greater than 85% and an isotactic index of greater than 85;
  (b) about 20% to about 60% of an amorphous copolymer of monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% of a polymerized diene, and containing less than 70% polymerized ethylene and being soluble in xylene at ambient temperature; and
  (c) about 3% to about 40% of a copolymer of ethylene and propylene or a 4–8 C alpha-olefin that is insoluble in xylene at ambient temperature, wherein the thermoplastic olefin has a flexural modulus of greater than 150 but less than 1200 MPa.

9. The process of claim 8 wherein the propylene polymer material is a propylene homopolymer.

10. The process of claim 7 wherein the polymerizable monomer is styrene.

11. The process of claim 7 wherein the polymerizable monomer is methyl methacrylate.

12. The process of claim 7 wherein the smectite clay is montmorillonite in its sodium exchanged form.

13. The process of claim 7 wherein the particulate propylene polymer material, is heated to the reaction temperature, the organic free radical initiator is added, and a suspension of the clay in liquid monomer is then added separately.

14. The process of claim 7 wherein the particulate propylene polymer material is mixed with a suspension of the clay in liquid monomer, the mixture is heated to the reaction temperature, and the organic free radical initiator is added.

15. The process of claim 7 wherein a suspension of the clay in liquid monomer and the organic free radical initiator are added concurrently to the particulate propylene polymer material, which has been heated to the reaction temperature.

16. The process of claim 7 wherein the clay is mixed with the particulate propylene polymer material in the presence of a hydrocarbon solvent, the mixture is heated to the reaction temperature to remove the solvent, and the organic free radical initiator and liquid monomer are added concurrently.

17. A composition comprising the composite material of claim 1 and about 2% to about 45% of a rubber component, based on the total weight of the composition.

18. A composition comprising the composite material of claim 1 and about 5% to about 90% of a broad molecular weight distribution propylene polymer material having a $M_w/M_n$ of about 5 to about 60.

19. A composition comprising the composite material of claim 17 that additionally comprises about 5% to about 90% of a broad molecular weight distribution propylene polymer material having a $M_w/M_n$ of about 5 to about 60.

* * * * *